INVENTORS
Alpheus W. Altorfer Jr.
John A. Castricone
By J. Preston Swecker
ATTORNEY

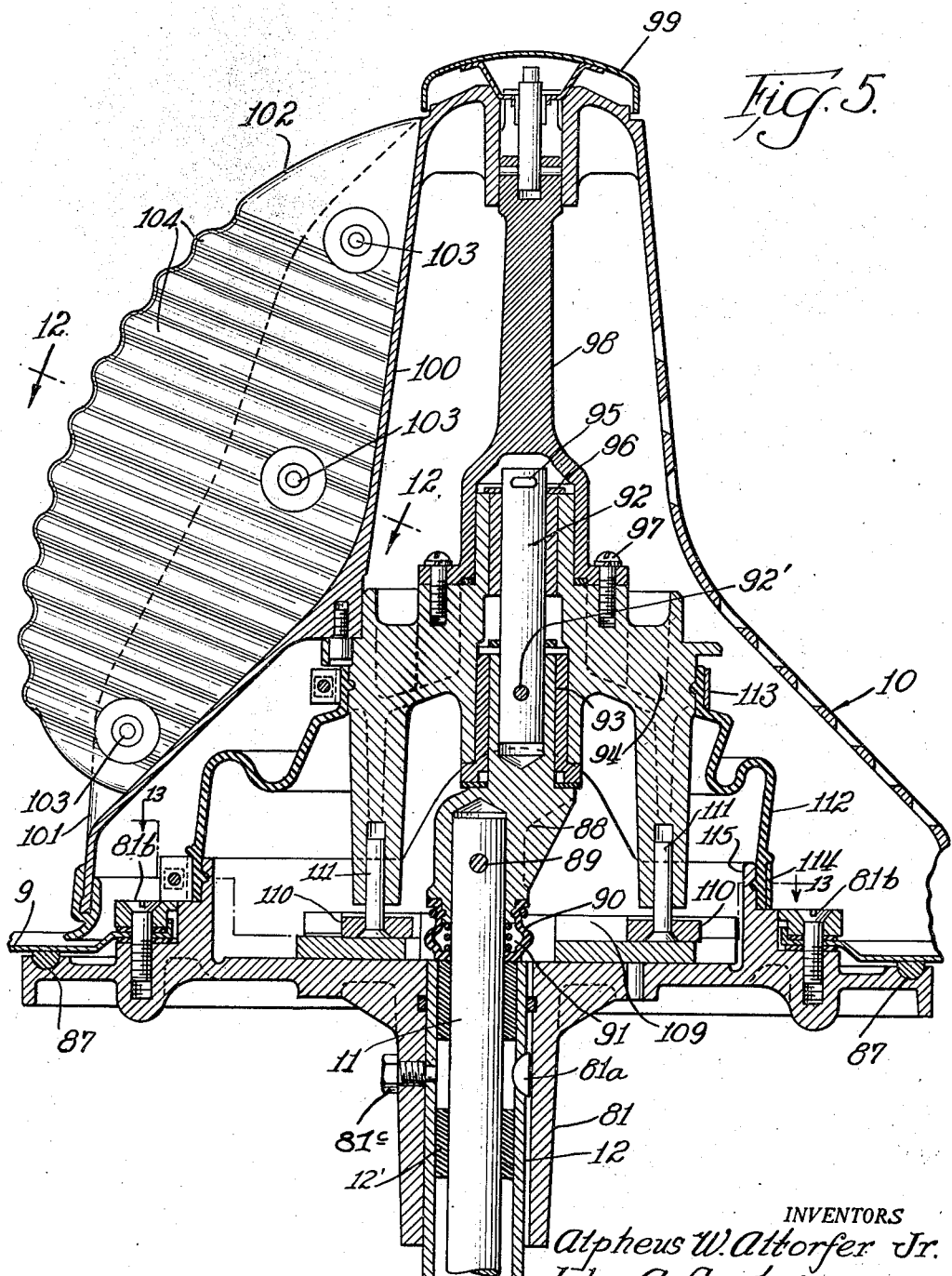

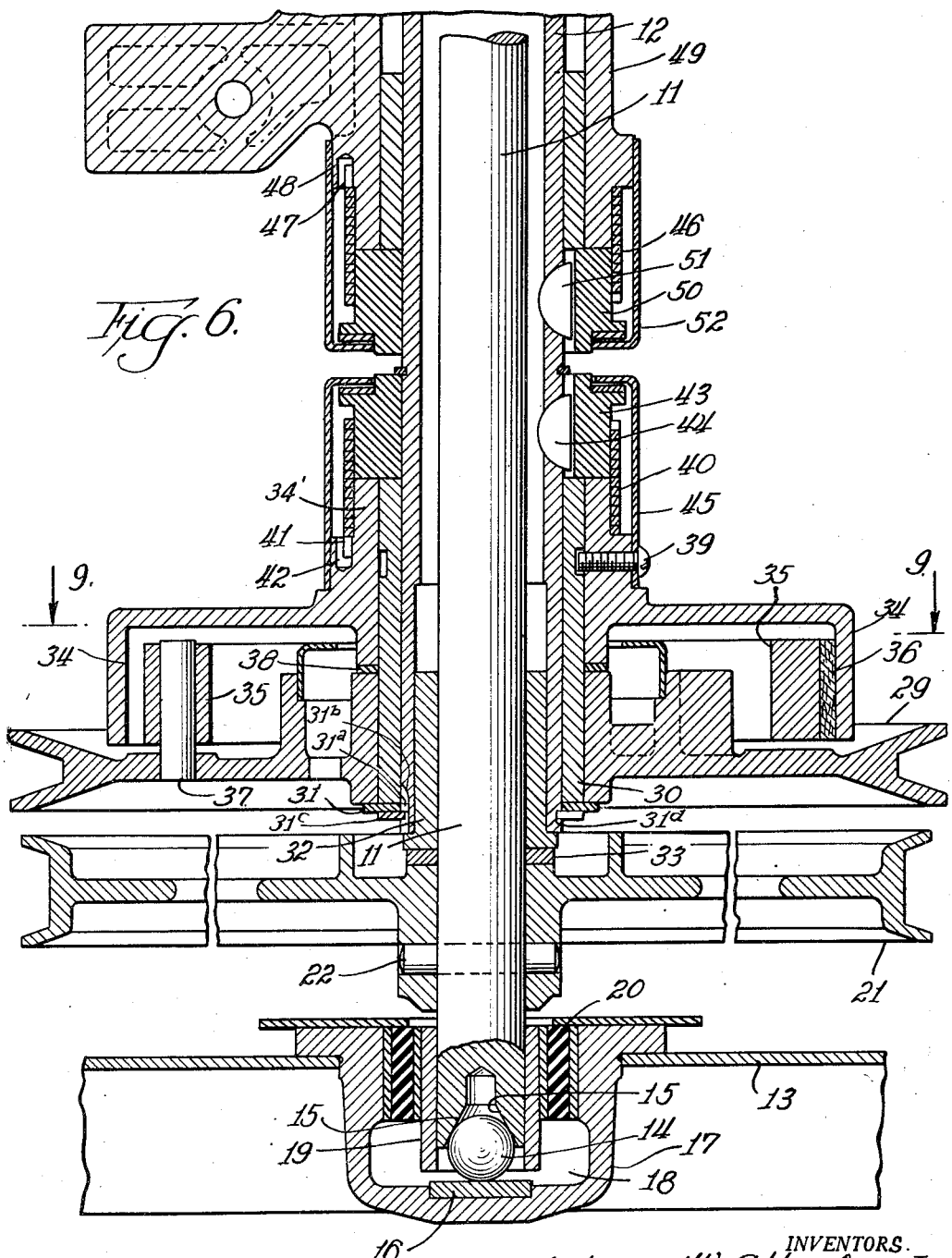

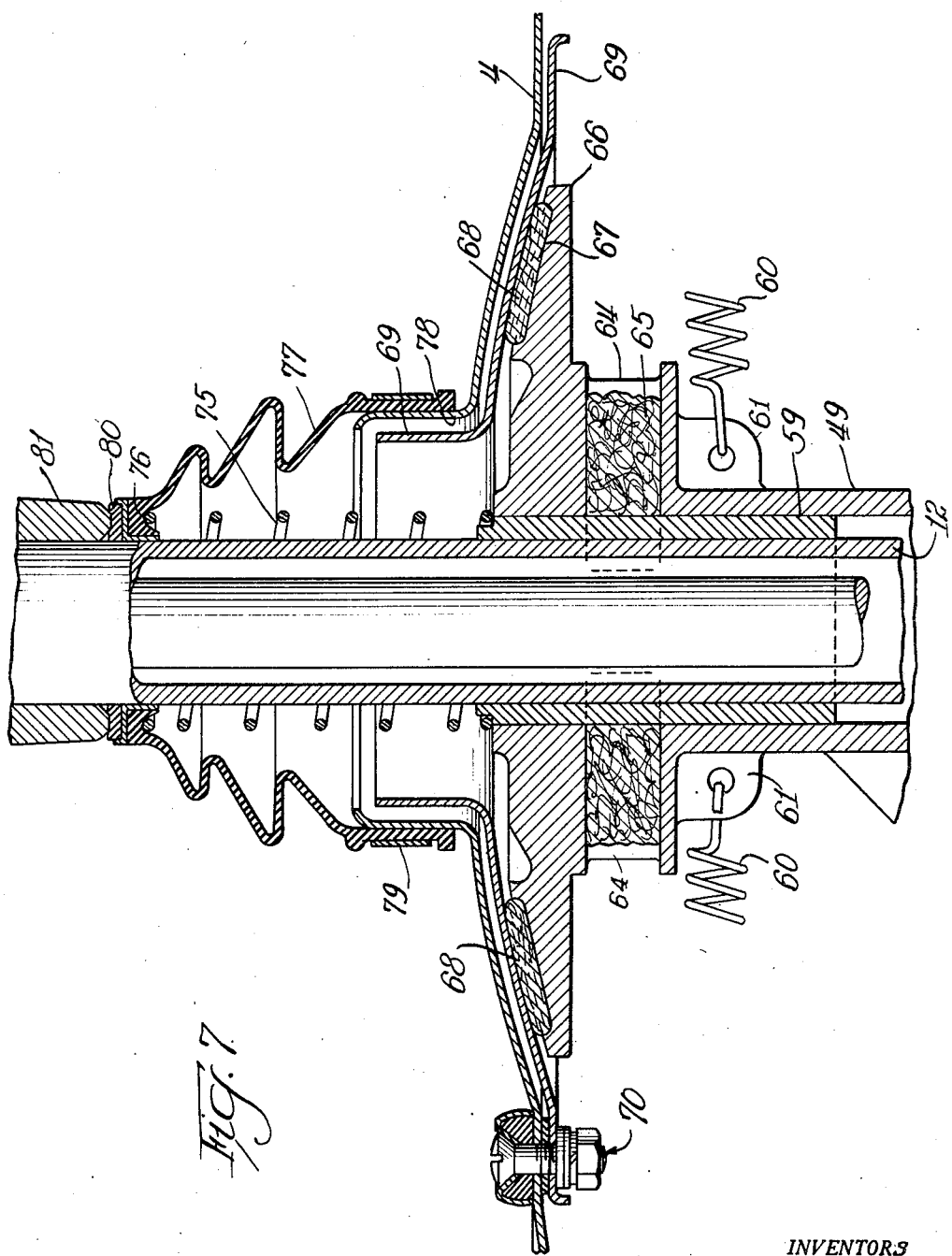

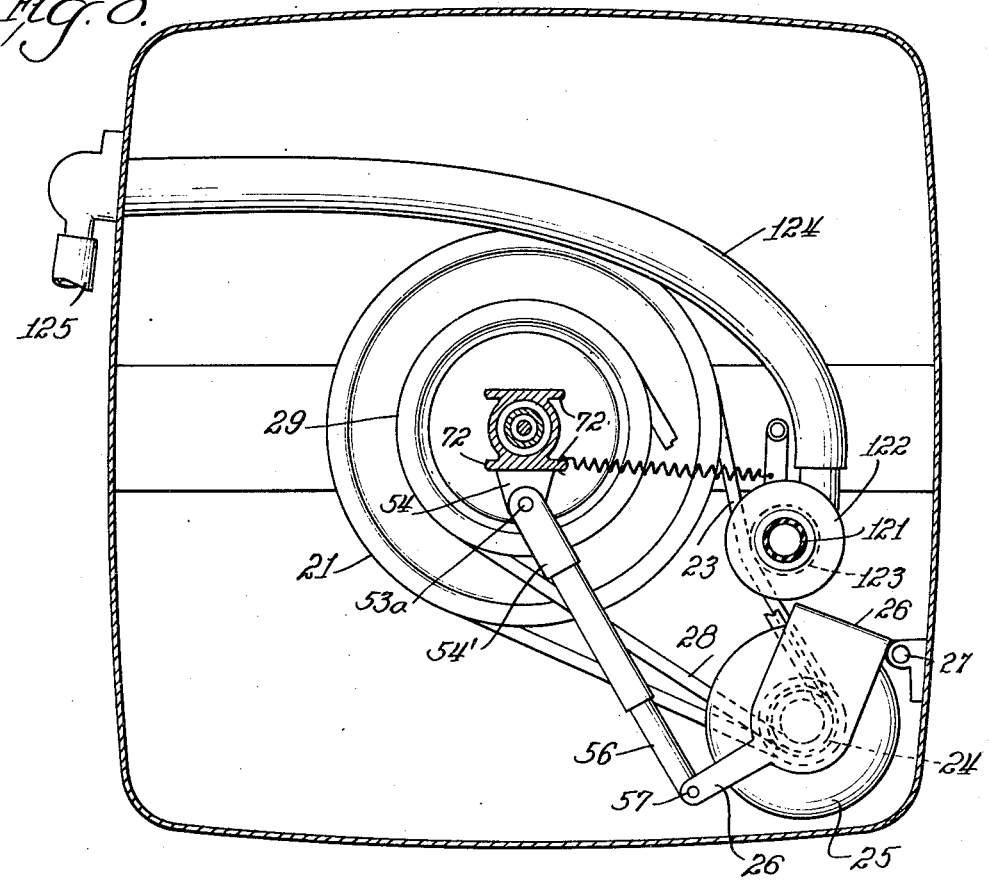
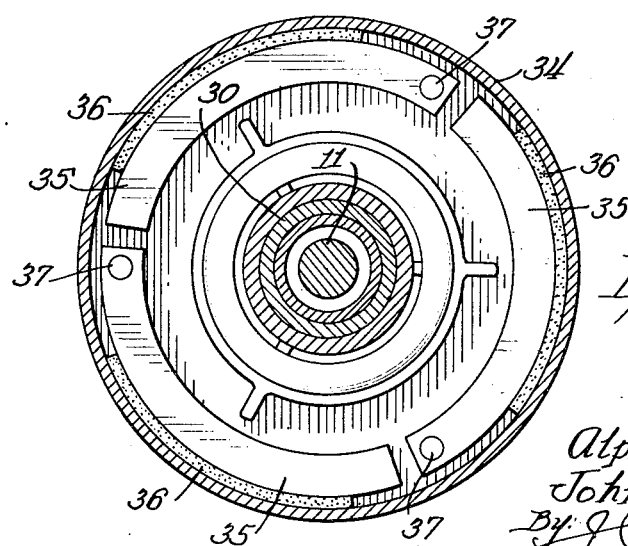

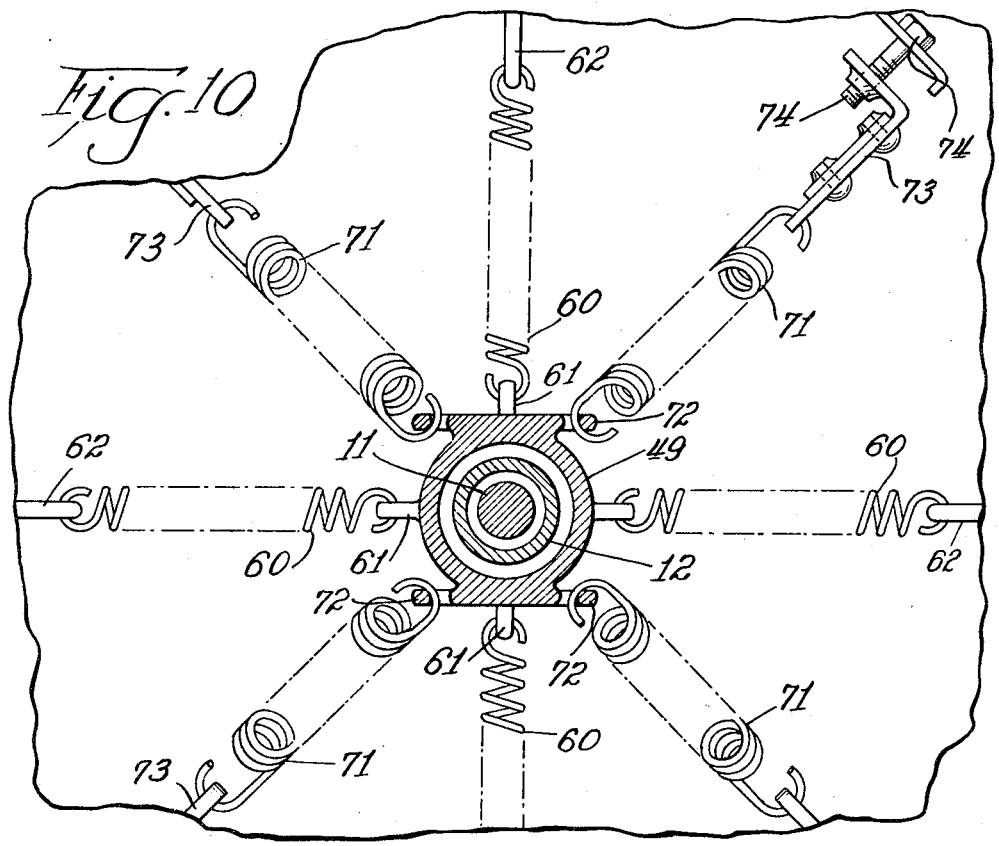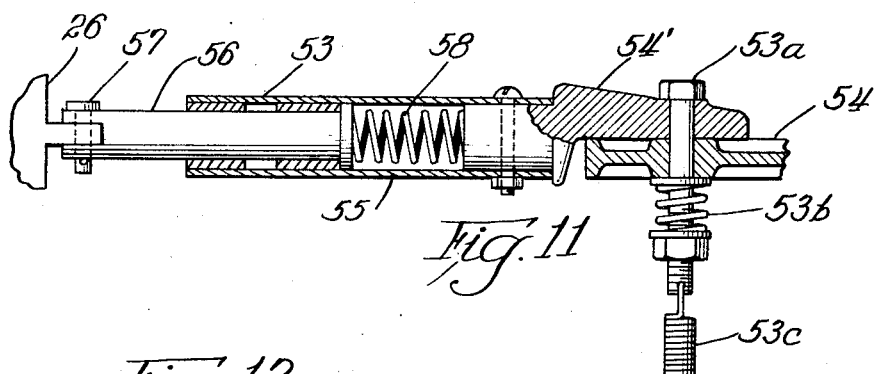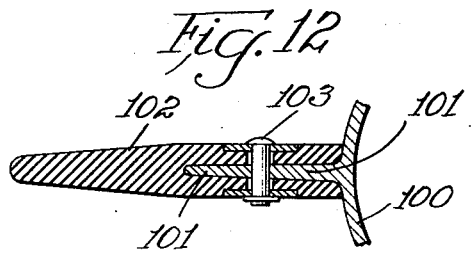

June 7, 1955 A. W. ALTORFER, JR., ET AL 2,709,908
CLOTHES WASHING MACHINES
Filed Sept. 26, 1950 9 Sheets-Sheet 9

INVENTORS.
Alpheus W. Altorfer Jr.
John A. Castricone
ATTORNEY

United States Patent Office 2,709,908
Patented June 7, 1955

2,709,908
CLOTHES WASHING MACHINES

Alpheus W. Altorfer, Jr., and John A. Castricone, Peoria, Ill., assignors to Altorfer Bros. Company, Peoria, Ill., a corporation of Illinois Application September 26, 1950, Serial No. 186,806

21 Claims. (Cl. 68—23)

This invention relates to improvements in clothes washing machines, and more particularly to machines of the automatic type which provide a cycle of operation including the washing, rinsing and drying of the clothes.

In some automatic clothes washing machines as provided generally heretofore, the washing action obtained thereby has been ineffective and unsuccessful; the rinsing action has been defective, leaving soap and dirt in the clothes, resulting in a gray or off-white appearance; the drying action has often resulted in leaving a substantial quantity of water in the clothes, whereby they were not effectively dried; the operation of the cycle of movements often involved appreciable vibration which was so severe in some instances as to require the bolting of the machine to the floor; the construction thereof was so complex as to be expensive to build without accomplishing the desired results; and there have been other objections encountered in the use thereof.

One object of this invention is to overcome these objections to automatic clothes washing machines and to provide a machine which will be entirely satisfactory for performing the desired results.

Another object of the invention is to simplify and improve the mechanism for effecting the washing, rinsing, and drying operations, which is practical to build and to use and accomplishes the desired results.

Still another object of the invention is to improve the mechanism for effecting the washing action in the tub, whereby the wasting means is operated to accomplish an effective washing action by simplified structure that is inexpensive to manufacture and use and which, nevertheless, will provide an effective action without appreciable vibration.

Another object of the invention is to provide a co-operation between the washing and drying means, utilizing an inner or spinning tub to effect a drying operation within which the washing device is located, but with provision for avoiding vibration by breaking the rhythm between the inner tub and the dasher mounted therein to provide an effective washing action, as well as an effective drying action separately and without vibration.

A still further object of the invention is to effect a shampooing of the clothes by the working through the clothes of a thick soap solution, using soap material or other wetting agent which is so distributed through the clothes as to improve the washing action obtained thereby with better effect than could be obtained heretofore, securing in fact the effects that would be obtained by hand soaping of the clothes before the washing operation.

A still further object of the invention is to produce a splash rinse which will have the effect of removing the soap and foreign material from the top of the rinse bath, getting the major dirt out initially before rinsing, resulting in a cleaner wash without streaks or gray effect. This may accomplish an automatic water level in the tub, inasmuch as surplus water is removed therefrom, automatically lowering the water level to the desired point.

These objects may be accomplished according to one embodiment of the invention by the provision in a stationary tub or casing of an inner or spinning tub having a dasher mounted therein, with power means for operating the dasher and inner or spinning tub to accomplish the desired operations. The inner or spinning tub is substantially imperforate except for water outlets at or adjacent the upper edge thereof, with provision for controlling the discharge therethrough so as to accomplish the splash rinse referred to above and the automatic water level control.

The dasher is driven in cyclic manner to accomplish a washing action, preferably being operated by an electric motor which is reversible and which drives the dasher in one direction for washing and in the opposite direction jointly with the inner tub for drying. A single central supporting column preferably mounts both the dasher and the inner tub, with suitable controls to effect operation thereof without appreciable vibration.

Other features thereof are set forth hereinafter, according to one embodiment of the invention illustrated in the accompanying drawings, in which:

Fig. 5 is an enlarged vertical cross section showing the dasher and the driving connection therewith;

Fig. 6 is a similar view showing the drive means for the dasher and inner tub;

Fig. 7 is a similar view of the dampener device;

Fig. 8 is a cross section through the lower portion of the machine substantially on the line 8—8 in Fig. 1;

Fig. 9 is a similar view through the drive clutch on the line 9—9 in Fig. 6;

Fig. 10 is a cross section through a portion of the dampener device on the line 10—10 in Fig. 1;

Fig. 11 is a detail longitudinal section through the belt tensioning device on the line 11—11 in Fig. 1;

Fig. 12 is a detail cross section through one of the dasher vanes on the line 12—12 in Fig. 5;

Figure 1:
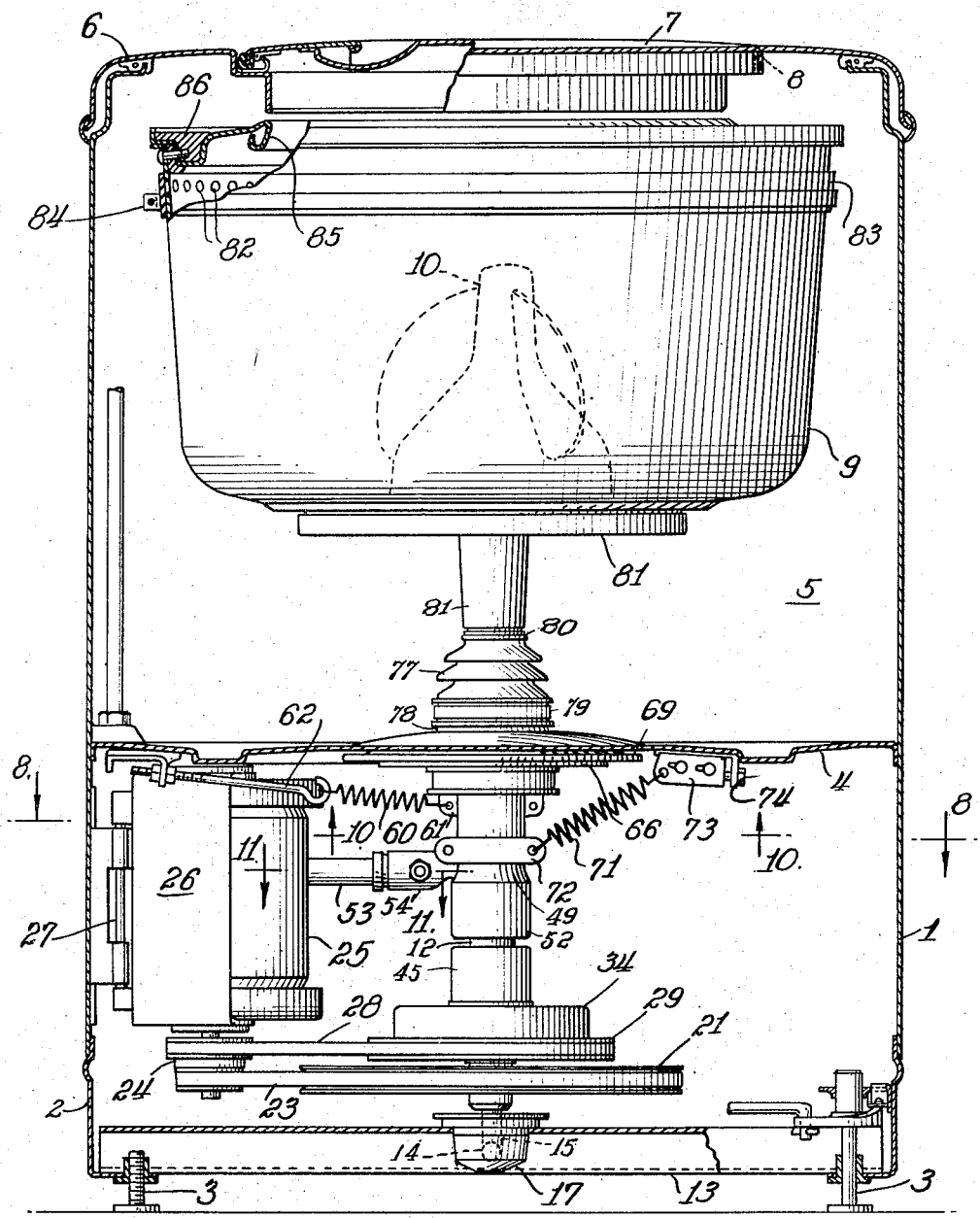
Fig. 1 is a vertical section through a clothes washing machine with parts shown in elevation, and other parts omitted, and comprising a preferred embodiment thereof.
Figure 2:
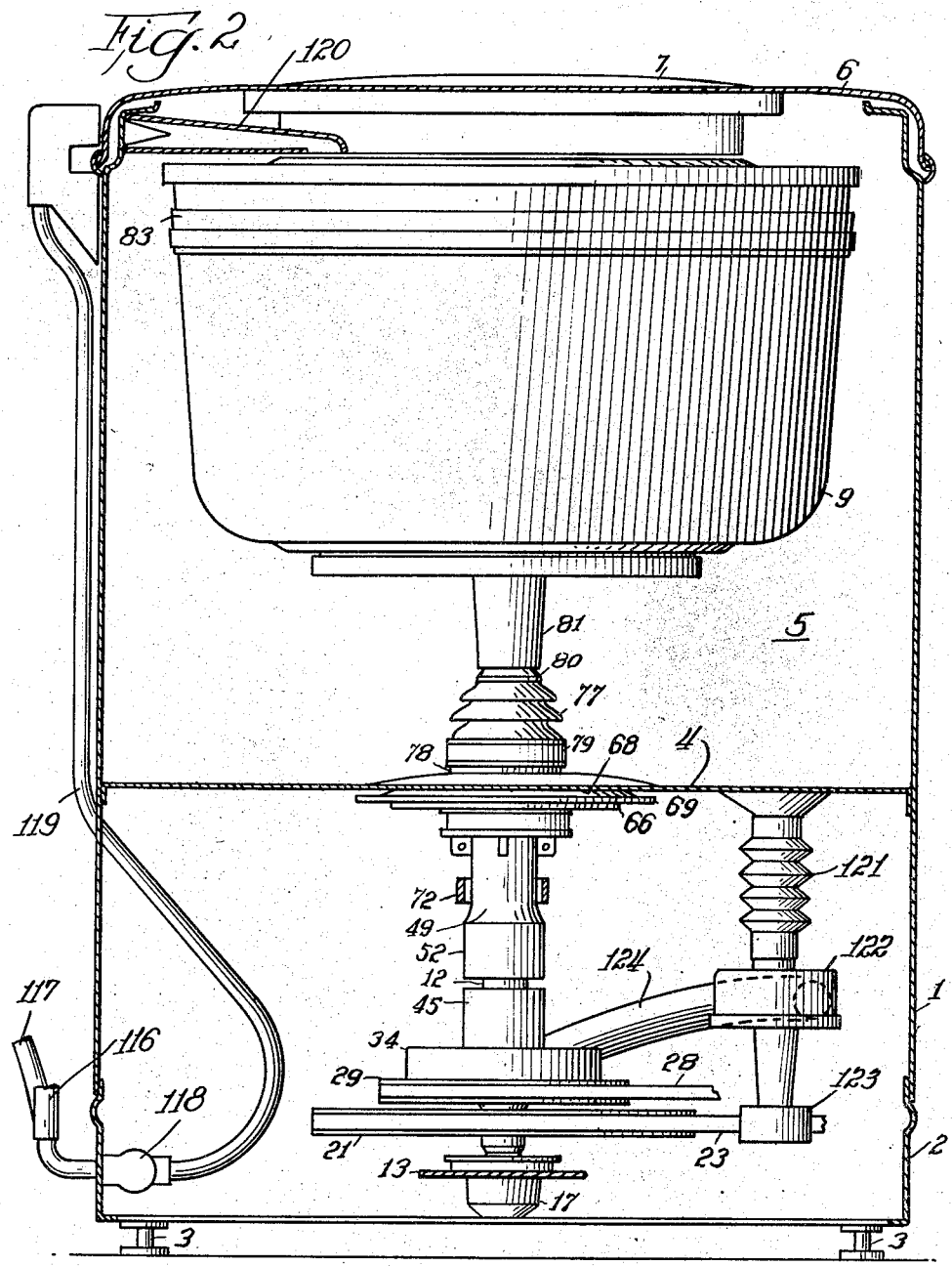
Fig. 2 is a similar view substantially at right angles to Fig. 1 and diagrammatically illustrating the major parts of the construction.
Figure 3:
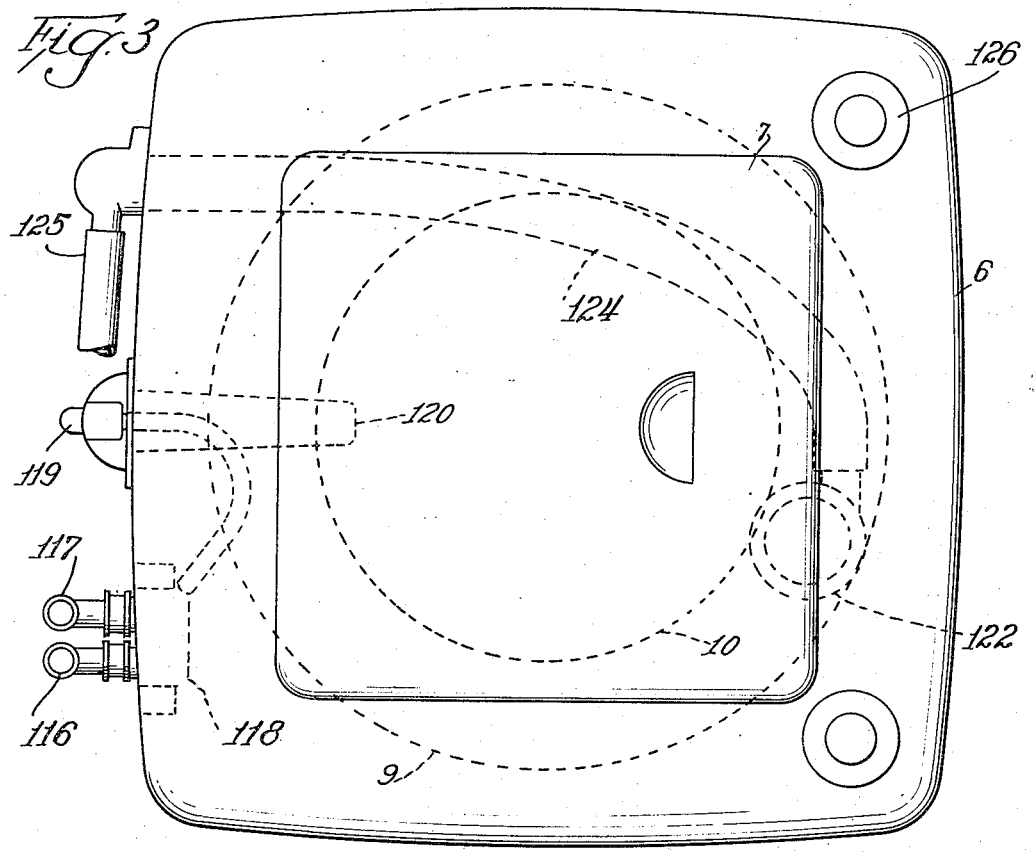
Fig. 3 is a top plan view thereof.

Referring to Figs. 1, 2 and 3 of the drawings, the washing machine includes a main casing, generally designated at 1, mounted upon a base 2, which casing and base support and enclose the operating parts of the machine. The base 2 is mounted upon supporting feet 3 which may be in the form of adjustable supports, four of which are provided at the four corners of the casing, preferably having means for leveling the casing with respect to the floor surface on which it is mounted, as set forth and claimed in the application of John A. Castricone for Equalizing Mechanism, Serial No. 199,517, filed December 6, 1950.

The casing 1 has a closed bottom, generally indicated at 4, permanently secured to the surrounding wall thereof to provide in the casing a main water receptacle or tub, generally indicated at 5. The tub 5 is closed at the top by a top wall 6 secured to the surrounding walls of the casing 1, and which top wall has a central opening for access to the interior thereof. A lid 7 is mounted in the central opening, hinged at 8 to the top 6.

Operatively mounted in the tub 5 is an inner or spinning tub 9 adapted for rotation, as hereinafter described. Located within the spinning tub 9 is a dasher, generally indicated at 10, for washing clothes within the spinning tub 9. This washing device or dasher 10 will be described more in detail hereinafter, but is shown in the form of a dasher operatively mounted on a main drive shaft 11 that extends vertically in the casing 1 and downwardly in the base 2 (Fig. 6). The shaft 11 is surrounded by a drive sleeve 12 having driving connection with the inner tub 9 for operating the latter, having bearings 12' and 32 therein at the top and bottom, respectively (see Figs. 5 and 6).

The drive shaft 11 is supported at its lower end on a single cross support member 13, as shown in Fig. 6, which support member 13 extends transversely of the bottom of the base 2 and is carried thereby. This support member 13 mounts the shaft 11 in a single end-thrust bearing to provide for gyratory motion of the shaft in the tub.

In the form illustrated in Fig. 6, the end-thrust bearing comprises a ball-bearing 14 seated in a recess 15 in the end of the shaft 11 and mounted upon a support disc 16. The support disc 16 is carried by a cup 17 suspended from the cross member 13 and having a reservoir 18 therein adapted to be filled with lubricant to assure smooth operation without appreciable friction.

A bearing sleeve 19 surrounds the lower end of the shaft 11 between the latter and a yieldable cushion 20, preferably in the form of a soft rubber ring which is interposed between the bearing sleeve 19 and the periphery of the cup 17.

This bearing structure supports the lower end of the shaft for freedom of rotation and also for gyratory motion. All driving and driven connections with the shaft are located above the bearing. Such a device reduces vibration to a minimum.

The shaft 11 has a pulley 21 secured thereto as by a pin 22 that extends through the shaft and through the hub of the pulley. The pulley 21 is connected by a belt 23 (Fig. 1) with a double drive pulley 24 mounted on the armature shaft of an electric motor 25. It is preferred that the motor 25 be reversible so that it may drive in each of opposite directions.

The motor 25 is carried by a support 26 pivotally mounted about an upright pivot 27 on a side of the base 2, whereby this motor and its support 26 may swing from side to side with respect to the base of the casing.

The motor 25 also drives a belt 28 extending over the double pulley 24 to a pulley 29 for operating the drive sleeve 12. This drive is through a clutch connection, as shown more in detail in Fig. 6.

The pulley 29 has its hub surrounding a bearing sleeve 30 on which the pulley is journaled for freedom of turning movement relative thereto. The pulley 29 and bearing sleeve 30 are carried upon a washer 31, as shown in Fig. 6, which has a key 31a in one side of the inner diameter thereof slidably fitting in a longitudinal groove 31b provided in the drive sleeve 12 so as to rotate with the latter. The washer 31 is retained in place lengthwise of the drive sleeve 12 by a snap spring ring 31c which engages in a peripheral groove 31d in the drive sleeve 12 adjacent the lower end of the latter. The drive sleeve 12 is supported in turn on a bearing sleeve 32 seated upon a bearing washer 33 on the top face of the hub of the drive pulley 21.

Surrounding the bearing sleeve 30 is a clutch drum 34 enclosing therein clutch shoes 35 (Figs. 6 and 9) having friction surfaces such as may be provided by brake-lining, generally indicated at 36. The shoes 35 are of the centrifugal engaging type and are mounted, respectively, on pins 37 carried by the drive pulley 29. This provides a centrifugal clutch engagement between the pulley 29 and the drive sleeve 12, which operates to drive the latter upon rotation of the pulley 29 in one direction, but to allow for freedom of turning movement of the pulley in the opposite direction without rotation of the drive sleeve 12.

The clutch drum 34 is shown as seated upon a supporting washer 38 upon the upper end of the hub of the pulley 29 and is retained in place on the bearing sleeve 30 by a pin 39 threaded therethrough and into an annular groove in the bearing sleeve 30.

The clutch drum 34 has an upturned hub portion 34' thereon, about which a helical spring 40 is wound, with the lower end of the helical spring 40 provided with a downturned tang 41 engaging in a hole 42 provided in the hub portion of the clutch drum 34 to anchor the end of the spring 40 thereto. The helical spring 40 is turned in a right-hand direction or counterclockwise, as viewed from the upper end of the shaft 11. The spring is wound with the convolutions thereof extending from the end of the hub of the clutch drum 34 and over a sleeve 43 with which the spring is not connected except by frictional engagement upon tightening of the spring therearound. The sleeve 43 is keyed at 44 to the drive sleeve 12. A cover 45 encloses the spring 40 and the sleeve 43.

Above the right-hand helical spring 40 is located a left-hand helical spring 46, one end of which is in the form of a tang 47 engaging in a hole 48 in a bearing support 49. One end of the left-hand spring 46 is anchored thereby to the fixed bearing support 49, while the convolutions of the spring extend from the bearing support around a sleeve 50 overlapped thereby, but free of positive connection with the spring except through gripping engagement upon tightening of the spring. The sleeve 50 is keyed at 51 to the drive sleeve 12. A cover 52 encloses the spring 46.

From the above description it will be understood that when the pulley 29 is rotated in a counter-clockwise direction, the spring 40 will act to transmit driving movement from the clutch drum 34 to the driving sleeve or tubular shaft 12. During such rotation, the spring 46 will be released from gripping engagement with the sleeve 50 and thereby will permit rotation of the tubular shaft 12 in a counter-clockwise direction. However, when the pulley 29 is rotated clockwise, the spring 46 will resist clockwise direction of rotation of the tubular shaft 12 and thereby will hold the latter stationary. Consequently, the drive sleeve or tubular shaft 12 is permitted to rotate in a counter-clockwise direction but is retained against rotation in clockwise direction. Since the spinning tub 9 is connected with this tubular shaft 12, it is caused to rotate in one direction only and is held against rotation in the opposite direction.

The pivotal mounting 27 of the drive motor 25 provides for tightening of the belts 23, 28 by an interposed belt-tightener, generally indicated at 53 as shown in Figs. 1 and 11. The belt-tightener 53 is interposed between the bearing support 49 and the support mounting 26 of the motor 25. The bearing support 49 has a bracket 54 on one side thereof with which the belt-tightener 53 is connected.

As shown in Fig. 11, a tube 55 is sleeved over an end member 54' and is secured thereto. A rod 56 is telescoped into the tube 55 at one end and is pivotally connected at 57 at its opposite end with the motor support 26. A coiled spring 58 is interposed between the outer end of the rod 56 and the adjacent end of the member 54'. This is a compression spring normally tending to separate the rod 56 from the bracket 54 and thereby pushing the motor support 26 in an outward direction away from the axis of the shaft 11, thereby tightening the belts 23 and 28 by the tension applied thereto. The member 54' is connected with the bracket 54 by a bolt 53a on which a compression spring 53b is sleeved. A tension spring 53c is connected with the outer end of the bolt 53a to resist the torque effect of the drive belts.

The upper end portion of the bearing support 49 is shown in Fig. 7 as separated from the tubular shaft 12 by a bearing sleeve 59. This upper end portion of the bearing support 49 is held yieldably in a central position by diverging coiled springs 60 extending in different directions therefrom. Four of such springs 60 are illustrated in Fig. 10 spaced 90° apart and extending outwardly from ears 61 on the bearing support 49 to rods 62 adjustably connected to adjacent portions of the casing 1. These are tension springs 60 which can be adjusted by the bolts 62 to maintain the bearing support 49 in the proper and desired position for smooth operation.

Provision is made for reducing friction at the bearing 59 by supplying lubricant thereto through the sides of the bearing support 49. Openings are provided in the latter, as indicated at 64, within which lubricant absorbing waste 65 may be inserted into contact with the sleeve 59.

At the upper end of the bearing support 49, and secured rigidly thereto, is a flaring plate 66, the top face of which is substantially convex or spherical in the example illustrated in Fig. 7. Formed in this convex face is a depressed seat 67 within which is secured a peripheral strip of friction material, generally indicated at 68, preferably of the nature of brake-lining or other suitable material.

Cooperating with the friction material 68 is a member 69 which may be coated with a vitreous enamel and has a conical undersurface in position for frictional engagement with the brake-lining material 68. The cone member 69 is secured by bolts 70 to the bottom 4 of the tub 5 but in spaced relation with the latter, as shown in Fig. 7. This member 69 cooperating with the friction material 68 forms a snubber for the drive shafts of the spinning tub. The friction material 68 is held in frictional engagement with the member 69 by four coiled springs 71 (see Fig. 10) connected with ears 72 on the bearing support 49 and extending outwardly therefrom in upwardly inclined directions, as shown in Fig. 1, to brackets 73. The brackets 73 hold the springs 71 in tension and may be adjusted by bolts 74 extending from the brackets 73 to supports on the bottom 4 of the tub 5.

By means of this construction, it will be understood that the friction of the bearing support 49 on the member 69 can be adjusted to resist sidewise movement, by adjusting the tension of the springs 71. Thus, the orbital movements, as well as the gyratory action of the shafts 11 and 12, can be controlled within narrow limits to provide for smooth operation.

The bearing support 49 normally is urged downward by a coiled spring 75 interposed between the upper end of the bearing sleeve 59 and a seat 76 provided in a flexible boot 77, which is of bellows form for collapsing action, as indicated in Fig. 7. The lower end of the boot 77 is shown as secured to a central collar 78 formed in the bottom wall 4 of the tub by a surrounding clamp 79. This forms a water-tight connection at the center of the tub and prevents the leakage of water downward into the lower portion of the casing. The boot 77 may be formed of rubber or other suitable material for the desired degree of flexibility and yieldability, and the upper end thereof is pressed upwardly in sealing relation around the tubular shaft 12.

The upper end of the boot 77 is pressed by the spring 75 against a washer 80, such as a carbon disc, which bears in water-tight relation against the lower end of the hub of a casting 81 keyed or pinned or otherwise secured rigidly to the tubular shaft 12 at 81a, and connected with the spinning tub 9 at 81b (see Fig. 5), supporting the spinning tub on the tubular shaft. The tub 9 is prevented from sliding down on the tubular shaft 12 by a set screw 81c which is secured in the hub and shaft, as shown in Fig. 5.

The surrounding wall and bottom of the spinning tub 9 is imperforate substantially throughout, except for a row of perforations 82 provided in the spinning tub 9 adjacent the upper end thereof, through which perforations water may be discharged from the interior of the spinning tub. The row of perforations 82 are provided with check-valve means on the periphery of the spinning tub to control the discharge of water therethrough. In the form illustrated, the check-valve means comprises an elastic band 83 surrounding the spinning tub 9 in overlapping relation with the holes 82 and secured along one edge thereof directly to the periphery of the spinning tub. A clamp 84 connects the ends of the band 83 together and holds it tightly around the spinning tub.

As water is ejected from the interior of the spinning tub 9 by centrifugal force resulting from the rotation thereof at high speed, this water will force outward the free edge portion of the elastic band 83 to permit discharge of the water into the main tub 5. However, when the spinning tub 9 is not rotating at its normal speed, the elasticity of the band 83 will hold it pressed tightly over the perforations 82, closing the latter against the normal water pressure within the tub and preventing the discharge of water therethrough, except when the tub is operating at its ejecting speed.

The upper edge of the spinning tub 9 is turned inward and provided with a rim 85 spaced from the periphery of the tub to confine the water and clothes therein during normal filling of the spinning tub or for washing action. The rim portion of the spinning tub 9 is provided with a flywheel or weight 86 extending continuously throughout the circumference of the rim portion of the tub to aid in balancing the tub and to provide for the desired gyratory motion during operation of the machine, whereby vibration is reduced to a minimum.

The center portion of the spinning tub 9 is sealed against the leakage of water into the drive column by an interposed gasket 87, shown in Fig. 5, and by the sealing relation provided at the inner edge of the spinning tub secured by the screws 81b. This construction provides a tight driving connection between the tubular shaft 12 and the casting 81, as well as between the latter and the spinning tub, whereby the spinning tub will be rotated at the required speed upon operation of the tubular shaft 12.

We have shown in Fig. 5 a form of dasher 10 which corresponds generally with that set forth in the patent of John A. Castricone, No. 2,416,611, February 25, 1947, which is operated in orbital movement substantially as set forth in said patent. This orbital movement is produced upon rotation of the shaft 11, the axis of the dasher 10 being offset from the axis of the shaft, as will be apparent from Fig. 5.

Mounted on the upper end of the shaft 11 is a crank member 88 secured by a pin 89 to the drive shaft 11. The lower end of the crank member 88 is sealed around the drive shaft 11 by a rubber sleeve 90 and a coiled spring 91.

The crank member 88 carries an upstanding crank pin 92 eccentrically arranged relative to the axis of the drive shaft 11, which crank pin is secured in the bore of the crank member 88 by a pin 92'. Journaled on the crank pin 92 and on the peripheral portion 93 of the crank member 88 is a head or a casting 94. The latter is held in place on the end of the crank pin 92 by a cotter pin 95 and a washer 96.

Secured upon the casting 94 by screws 97 is a connecting rod 98, the lower end of which is telescoped over the projecting upper end of the casting 94 and crank pin 92, being seated thereon and secured rigidly thereto by the screws 97. The upper end of the connecting rod 98 is secured to the dasher 10 by a hand nut 99.

The dasher 10 in the form illustrated is hollow and substantially conical, as set forth more in detail in the above-mentioned Castricone patent, No. 2,416,611. It is provided with a central column, generally indicated at 100, along which extend a plurality of circumferentially spaced vanes 101 substantially throughout the height of the column. On certain of the vanes, a plurality thereof, we prefer to provide fins 102 secured to the vanes 101 by rivets or other fastenings 103 (Fig. 12). The fins 102 preferably are formed of soft rubber or other elastic material and are relatively flexible to aid in distributing the clothes around the tub 9, to aid in the washing effect by rubbing and flexing, producing somewat of a "washboard" effect due to the transverse corrugations or ribs 104, and to aid in drying the clothes during spinning operation of the tub 9.

The provision of the fins 102 on the dasher 10 is set forth and claimed in an application of John A. Castricone, Ser. No. 124,739, filed November 1, 1949, now Patent No. 2,619,827, dated December 2, 1952.

Figure 13:
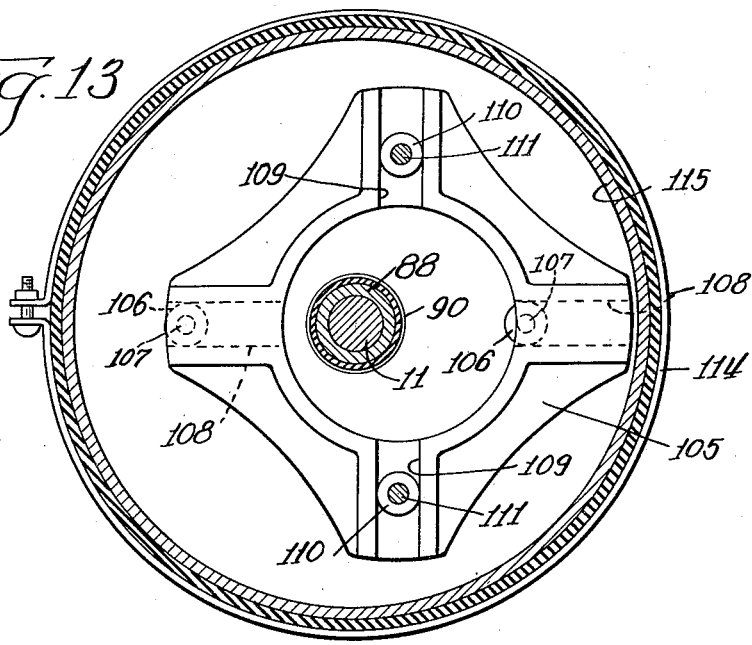
Fig. 13 is a cross section through the dasher mounting on the line 13—13 in Fig. 5.
Figure 14:
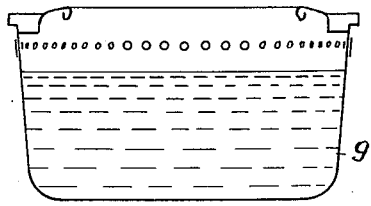
Fig. 14 is a diagrammatic section through the inner tub, showing the normal water level for washing.
Figure 15:
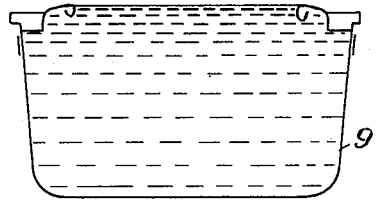
Fig. 15 is a similar view showing the water level for splash rinsing.

The motion of the casting or head 94 is controlled by a spider 105 mounted loosely on the casting 81, as shown in Fig. 5. A pair of slides 106 (Fig. 13) are secured by pins 107 to the casting 94 on diametrically opposite sides of the drive column thereof, which slides 106 operate in slots 108 in the spider 105. The spider 105 is provided also with a pair of slots 109 diametrically on opposite sides thereof and at right angles to the slots 108. Slides 110 operate in the slots 109 and are connected by pins 111 with the lower end portion of the drive casting or head 94. This provides a uniform bodily orbital motion of the drive casting 94 and of the dasher 10 around the axis of the drive shaft 11 without rotation on its axis, upon rotation of the drive shaft.

These parts are enclosed within a water-tight boot or sleeve 112, preferably made of rubber or other flexible or elastic material. The boot 112 is secured by a clamp 113 in the form of a band enclosing the upper edge thereof and connecting said edge directly to the periphery of the drive casting 94. The lower end of the boot 112 is secured in like manner by a clamping band 114 to the periphery of an upstanding rib 115 provided on the casting 81. This will exclude water effectively from the operating parts of the machine without interfering with the freedom of operation thereof.

This clothes washing machine is adapted for automatic operation of washing and rinsing the clothes and effectively drying the same through a cycle of operations, which may be controlled manually or automatically by a timing device, the construction and operation of which are well understood in the art.

We have shown in Figs. 2 and 3 the hydraulic system connected with the machine to supply water thereto and to discharge the water therefrom. Hot and cold water supply pipes are shown generally at 116 and 117, connected to an intake valve 118 which serves as a mixing valve in which the desired temperature can be provided for the supply of water to the interior of the machine, either hot or cold water or water of the desired temperature. An inlet tube 119 extends from the valve 118 to a nozzle 120 that extends in overlapping relation with the rim 85 of the spinning tub 9, by means of which the water may be introduced into the latter as required.

A drain outlet 121 is provided from the bottom 4 of the tub 5, as shown in Fig. 2. A pump 122 is connected with the drain outlet 121 and is operated by a pulley 123 which is in peripheral bearing relation against the belt 23. A drain pipe 124 extends from the pump 122 for discharge of the water to a discharge hose 125 (Fig. 8).

Figure 4:
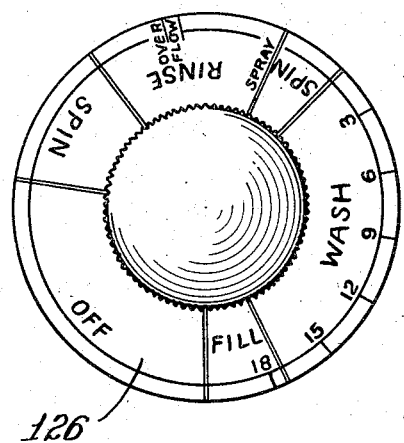
Fig. 4 is a top plan view of the control dial for the automatic functions of the machine.

As stated above, the operation of these parts, as well as of the motor 25, may be controlled either manually or automatically by conventional means, which is not illustrated in detail since it is well known that the valve 118 may be controlled electro-magnetically by a timer device, generally indicated at 126 in Figs. 3 and 4, which may be set to perform the several washing, rinsing, and drying operations sequentially, or the several steps set manually, as required. The several operations to be performed will be evident from the following description of the operation:

*Operation*

The water is admitted for washing action into the spinning tub 9 to the required extent and to the desired water level therein, which may be regulated manually or automatically. The clothes are introduced around the dasher 10 within the spinning tub 9, but it is not necessary with this machine to distribute the clothes uniformly around the dasher, since that will be accomplished automatically by the operation of the latter. The required wetting agent or soap material is then introduced and the washing operation progresses. The washing operation, according to this invention, is substantially the same as that set forth in the above-mentioned Castricone patent, No. 2,416,611. It is not necessary to use any special form of detergent or wetting agent, but ordinary soap material can be used effectively with this machine.

It is preferred that the washing action be started when the water level is much below the normal water level in the spinning tub 9, preferably between one-third and one-half full with respect to the normal water level. Where the clothes are added first before the water is introduced, or before the water has reached the normal water level, and the desired wetting agent or soap material has been added, the washing action should be started when the water level is low, below one-half the normal water level. The orbital movement of the dasher 10 in the washing tub 9 at that time serves not only to distribute the clothes uniformly around the dasher 10, but also distributes the wetting agent or soap material uniformly through the clothes in a thick soap solution, which produces a Shampooing action of the clothes. This has the effect of hand soaping of the clothes before washing. It aids very appreciably in removing the dirt from the clothes and producing a better washing effect.

After thus starting the washing action at a low water level, the admission of the water can continue during the Shampooing action until the water level reaches the normal or desired extent, when the soap solution would have been thinned out and the washing action then progresses as usual.

During the washing operation, the motor 25 operates to drive the shaft 11 at a driving speed of approximately 300 R. P. M., as one example of this invention. While the pulley 29 is also rotated during washing, the clutch 34—36, being a one-way engaging clutch, does not operate to drive the spinning tub 9, and the helical spring 46 then holds the spinning tub against rotation or creeping movement during the washing cycle.

After the completion of the washing operation, the wash water is removed from the tub 9, which is accomplished by reversing the direction of movement of the motor 25, which thereby drives the pulley 29 in the opposite direction and causes engagement of the clutch 34—36 to drive the tubular shaft 12. The driving of the clutch drum 34 causes engagement of the spring 40 to transmit the driving motion from the drum 34 to the shaft 12, the spring 46 being released during this operation. It is obvious that a higher speed of rotation is imparted to the shaft 12 than to the shaft 11 due to the difference in size of the pulleys 21 and 29 (see Fig. 1). It is preferred that the shaft 11 be driven at 300 R. P. M. both in forward and backward directions, and that the shaft 12 and the spinning tub 9 be operated at 550 R. P. M. These are relative speeds as preferred and may be varied as required. However, the operation of the respective shafts at different speeds breaks the rhythm between the movement of the dasher and the rotation of the tub 9 during the spinning operation and thereby reduces vibration appreciably.

As the spinning tub 9 is rotated at its desired spinning speed, the wash water is ejected therefrom through the perforations 82 by the centrifugal force acting on the water, the check valve 83 being opened by the force of the water and all of the wash water is removed from the tub into the main tub 5.

Thereafter, the clothes are rinsed by admitting clean rinse water into the tub 9. The spinning operation of the latter having been stopped, the dasher 10 is operated in its normal washing cycle, the tub 9 being held stationary. The filling of the tub 9 with rinse water is continued until the tub is entirely full and the water flows over the rim 85 thereof, which produces a splash rinse due to the operation of the dasher 10 therein. This splash rinse is caused by the cyclic motion of the dasher in the stationary tub 9 with the fins 102 projecting above the normal water level, and the characteristics of the dasher that cause the water to be forced upward between the spaced vanes 101, thereby splashing away the soapy material and foreign matter on the surface of the water in the tub, flowing it over the top edge or rim of the tub and getting it out of the rinse water. The latter will then serve effectively to continue the rinsing operation to the desired extent.

Then the rinse water is removed by the spinning of the tub 9 in the opposite direction, substantially as described above.

The splash rinse, as described, is an important feature of this invention, inasmuch as it removes the dirty water and excess soap material, which produces a better rinsing action than could be obtained otherwise, resulting in cleaner and whiter clothes without streaks or graying effect. During the rinsing operation, the tub 9 is held stationary while the dasher 10 is operated to produce the splashing effect by the action of the blades 102.

The latter blades not only are important in producing the splash rinse according to this invention, but also aid appreciably in drying the clothes during the spinning operation, since they produce a fan effect, blowing air over the clothes as the latter are packed around the inner wall of the tub 9. Thus, a better drying effect results therefrom. Moreover, these blades aid appreciably in the washing action, as well as in the distribution of the clothes around the tub 9 during washing, preventing bunching of the clothes therein. The latter tends to reduce vibration since the tub is substantially balanced.

The mounting and operation of the tub produces substantially a gyratory action by reason of the single thrust bearing 14 that supports the tub and its drive column at the bottom, cooperating with the balanced effect obtained by the circumferential weight 86 around the rim of the tub, which reduces vibration to a minimum. Moreover, the snubber provided at 66—69 also resists out-of-balance movement resiliently and thereby cooperates in reducing vibration in the operation of the machine.

Referring to Figs. 1 and 6, it will be apparent that the weight of the tub 9 and the operating mechanism therefor rests on the disc 16, being supported by the ball 14 and the shaft 11, which in turn operates the dasher mechanism shown in Fig. 5. As shown also in Fig. 6, the tub assembly rests on the hub of the pulley 21 by reason of the thrust washer 33 that supports the bearing 32 and the tube 12. When the machine is in operation and the pulley 21 is rotated, there is a certain amount of friction between the hub of the pulley 21 and the washer 33 and between the latter and the bearing 32. This friction will be sufficient to cause rotation of the tub assembly even without the use of the clutch 34, which latter may be omitted if desired and if sufficient friction will be present to accomplish rotation as described.

While the invention has been illustrated and described in one embodiment, it is recognized that variations and changes may be made therein without departing from the invention as set forth in the claims.

We claim:

1. In a clothes washing machine, the combination of a tub adapted to receive clothes, water and a soap material for washing action, said tub being substantially imperforate to the top edge thereof for substantial filling with water, means for adding water to the tub, a dasher movably mounted in the tub, and means for operating the dasher bodily in an orbital motion without rotation on its axis after filling the tub to the top edge thereof for creating a splashing action in the water and for splashing out of the tub over the top edge thereof the floating soap material and foreign matter.

2. In a clothes washing machine having a stationary tub, an inner tub mounted in the stationary tub and substantially imperforate throughout the height thereof to be substantially filled with water, said inner tub being adapted to receive clothes, wash water and a soap material for washing of the clothes therein, means for adding rinse water to the inner tub after the washing action substantially to fill the inner tub, floating the soap material on the surface of the rinse water, a dasher in the inner tub having upright vanes thereon, and means for operating the dasher bodily in an orbital motion without rotation on its axis in the rinse water for splashing the soap material away from the rinse water and out of the inner tub into the first-mentioned tub.

3. In a clothes washing machine having a stationary tub, an inner tub mounted in the stationary tub and imperforate throughout the height thereof to be filled with water, said inner tub being adapted to receive clothes, wash water and a soap material for washing of the clothes therein, means for adding rinse water to the inner tub after the washing action substantially to fill the inner tub, floating the soap material on the surface of the rinse water, a dasher in the inner tub having upright vanes thereon, means for operating the dasher bodily in an orbital motion without rotation on its axis in the rinse water for splashing the soap material away from the rinse water and out of the inner tub into the first-mentioned tub, said inner tub having perforations in the periphery thereof adjacent the top, check-valve means normally holding the perforations closed, and means mounting the inner tub for rotation for discharge of the water through the perforations.

4. In a clothes washing machine having a tub, an inner tub mounted on the first-mentioned tub and having perforations in the periphery thereof, a resilient band encircling the inner tub over the perforations and normally tending to hold the perforations closed and adapted to be opened by centrifugal force on the water therein upon rotation of the inner tub, and means securing the band to the inner tub along only one of the longitudinal edges of the band, the other longitudinal edge of the band being disconnected and outwardly yieldable relative to the tub substantially throughout its length.

5. In a clothes washing machine having a stationary tub, a spinning tub rotatably mounted in the stationary tub and adapted to contain water and clothes therein, said spinning tub having a rim at the upper edge thereof and perforations in the surrounding side thereof below the rim and in close proximity thereto, a resilient band encircling the inner tub over the perforations and normally holding the perforations closed and adapted to be opened by centrifugal force on the water therein upon rotation of the spinning tub for discharge of the water through the perforations into the stationary tub, means securing the band to the inner tub along one edge of the band with the opposite edge free throughout its length to move outward relative to the spinning tub and means for rotating the spinning tub at high speed, said band closing the perforations when the spinning tub is substantially stationary, permitting overflow of the water over the rim thereof and floating off soap and foreign matter therefrom during rinsing.

6. In a clothes washing machine having a tub, an inner tub mounted in the first-mentioned tub, a dasher mounted in the inner tub adapted for washing clothes therein, means for driving the dasher in one direction relative to the inner tub in washing action, and means for driving both the dasher and the inner tub in the opposite direction at different speeds to extract water from the clothes.

7. In a clothes washing machine having a stationary tub, a spinning tub mounted in the stationary tub and adapted to receive clothes therein for washing and rinsing, a dasher mounted in the spinning tub, a drive shaft for the dasher, means connecting the dasher with the drive shaft for moving the dasher bodily in an orbit relative to the axis of the drive shaft during rotation of the drive shaft, reversible direction means for operation of the drive shaft in one direction to move the dasher in washing action in the spinning tub, and means for rotating both the spinning tub and the drive shaft at different speeds to extract water from the clothes.

8. In a clothes washing machine having a stationary tub, a spinning tub mounted in the stationary tub and adapted to receive clothes therein for washing and rinsing, a dasher mounted in the spinning tub, a drive shaft for the dasher, means connecting the dasher with the drive shaft for moving the dasher bodily in an orbit relative to the axis of the drive shaft during rotation of the drive shaft, reversible direction means for operation of the drive shaft in one direction to move the dasher in washing action in the spinning tub and in the opposite direction during extracting, and separate drive means for rotating the spinning tub at a different speed from the last-mentioned dasher drive means to extract water from the clothes.

9. In a clothes washing machine having a stationary tub, a spinning tub mounted in the stationary tub and adapted to receive clothes therein for washing and rinsing, a dasher mounted in the spinning tub, a drive shaft for the dasher, means connecting the dasher with the drive shaft for moving the dasher bodily in an orbit relative to the axis of the drive shaft during rotation of the drive shaft, reversible direction means for operation of the drive shaft in one direction to move the dasher in washing action in the spinning tub, and means for rotating both the spinning tub and the drive shaft in the opposite direction at different speeds to extract water from the clothes.

10. In a clothes washing machine having a stationary tub, a spinning tub mounted in the stationary tub and adapted to receive clothes therein for washing and rinsing, a dasher mounted in the spinning tub, a drive shaft for the dasher, means connecting the dasher with the drive shaft for moving the dasher bodily in an orbit relative to the axis of the drive shaft during rotation of the drive shaft, reversible direction means for operation of the drive shaft in one direction to move the dasher in washing action in the spinning tub, a drive shaft for the spinning tub, and means connecting the driving means with the respective drive shafts for operating both said first and second-mentioned drive shafts in a reverse direction relative to the direction of the first-mentioned drive shaft and at different speeds to extract water from the clothes.

11. In a clothes washing machine, the combination of a spinning tub, a washing device operatively mounted in the tub, upright telescoping shafts operatively connected with the spinning tub and washing device respectively, a flywheel mounted on the top of the spinning tub, a single end-thrust bearing at the lower end of one of the shafts and supporting said shaft thereon, and drive means on the shafts above the end-thrust bearing.

12. In a clothes washing machine, the combination of a tub, a washing device operatively mounted in the tub, means for driving the spinning tub and washing device respectively including upright telescoping shafts, a single end-thrust bearing at the lower end of one of the shafts supporting said shaft directly therein, means supporting the other of said shafts on said first-mentioned shaft, and drive means for the shafts connected therewith above said end-thrust bearing.

13. In a clothes washing machine, the combination of a tub, a washing device operatively mounted in the tub, means for driving the spinning tub and washing device respectively including upright telescoping shafts, a single end-thrust bearing at the lower end of one of the shafts supporting said shaft directly therein, means supporting the other of said shafts on said first-mentioned shaft, said end-thrust bearing comprising a cup, a ball seated in the cup and supporting the last-mentioned shaft directly thereon, a bearing sleeve surrounding the lower end portion of said shaft in the cup, and a ring of yieldable material interposed between the bearing sleeve and the cup and holding the shaft on the ball during gyratory movement thereof.

14. In a clothes washing machine, the combination of an upright drive shaft, a tub supported thereon, and a step bearing supporting the drive shaft for gyratory movement, said step bearing including a cup, a ball mounted on the cup and having the drive shaft seated thereon, a bearing sleeve surrounding the drive shaft, and a ring of yieldable material surrounding the lower end portion of the shaft in the cup and holding the shaft on the ball during gyratory movement thereof.

15. In a washing machine, the combination with a receptacle adapted to contain a body of liquid for washing fabrics therein, a drive shaft journaled in and extending upwardly into the central portion of the receptacle, and a dasher driving head connected with the drive shaft in the receptacle and mounted for orbital movement about an upright axis relative thereto upon rotation of the drive shaft, a dasher movably supported on said head above the bottom of the receptacle and orbitally moving with said head about said upright axis, said dasher having at least a lower portion spaced from said head, means for sealing the central portion of the receptacle and portion of the drive shaft extending into the receptacle and restraining the dasher against axial rotation during said orbital movement, said means including a resilient boot spaced from the dasher and surrounding the drive shaft and having its lower end fixedly connected to the bottom of receptacle and its upper end fixedly connected to the driving head in spaced relation to the dasher.

16. In a washing machine, the combination with a receptacle adapted to contain a body of liquid for washing fabrics therein, a drive shaft journaled in the receptacle, and a dasher connected with the drive shaft in the receptacle and mounted for orbital movement about an upright axis relative thereto upon rotation of the drive shaft, of means for restraining the dasher against axial rotation during said orbital movement and including slide members operatively connected between the receptacle and the dasher.

17. In a washing machine, the combination with a receptacle adapted to contain a body of liquid for washing fabrics therein, a drive shaft journaled in the receptacle, and a dasher connected with the drive shaft in the receptacle and mounted for orbital movement about an upright axis relative thereto upon rotation of the drive shaft, of means for restraining the dasher against axial rotation during said orbital movement and including slide members connected with the dasher, and guides connected with the receptacle and slidably receiving said slide members.

18. In a washing machine, the combination of a drive shaft, a head operatively connected with the drive shaft and mounted for orbital movement about an upright axis relative thereto upon rotation of the drive shaft, a dasher supported on the head, a connecting rod secured to the head and extending upwardly therefrom in the upper portion of the dasher, and means securing said connecting rod with the dasher.

19. In a washing machine, the combination of a drive shaft, a crank member mounted on the drive shaft, a crank pin mounted on the crank member and offset from the axis of the drive shaft, a head mounted on the crank pin, a dasher detachably mounted on the head and extending upwardly therefrom, and a connecting rod secured to the head and extending upwardly in and operatively connected to the dasher.

20. In a clothes washing machine having a tub, an inner tub mounted in the first-mentioned tub, a dasher mounted in the inner tub adapted for washing clothes therein, means including a drive shaft for driving the dasher bodily in the inner tube in an orbit relative to the drive shaft to effect a washing action, means including a drive shaft for rotating the inner tub, and means for driving both the dasher and the inner tub drive shafts at different speeds to extract water from the clothes.

21. In a clothes washing machine having a stationary tube, an inner tub mounted in the stationary tub and imperforate throughout the height thereof to be filled with water, said inner tub being adapted to receive clothes, wash water and a soap material for washing of the clothes therein, means for adding rinse water to the inner tub after the washing action substantially to overflow and to fill the inner tub and thereby to float the soap material on the surface of the rinse water, a dasher in the inner tub, means for operating the dasher in an orbital motion without rotation on its axis in the rinse water for splashing the rinse water and soap material away from the rinse water and out of the inner tub into the first-mentioned tub and to reduce the water level in the tub, said inner tub having perforations in the periphery thereof adjacent the top, check-valve means normally holding the perforations closed, and means mounting the inner tub for rotation and effecting rotation thereof to open said check-valve means and effect discharge of the water through the perforations.

References Cited in the file of this patent

UNITED STATES PATENTS

| | | |
|---|---|---|
| 1,067,380 | Skitt | July 15, 1913 |
| 1,243,473 | Wilson | Oct. 16, 1917 |
| 1,274,184 | Moness | July 30, 1918 |
| 1,788,980 | Callebut | Jan. 13, 1931 |
| 2,186,786 | Jensen | Jan. 9, 1940 |
| 2,255,505 | Dunham | Sept. 9, 1941 |
| 2,279,878 | Suits | Apr. 14, 1942 |
| 2,331,897 | Dyer | Oct. 19, 1943 |
| 2,350,218 | De Remer | May 30, 1944 |
| 2,396,105 | Kirby | Mar. 5, 1946 |
| 2,416,611 | Castricone | Feb. 25, 1947 |
| 2,461,078 | Page | Feb. 8, 1949 |
| 2,470,140 | Castner | May 17, 1949 |
| 2,513,844 | Castner | July 4, 1950 |
| 2,554,573 | Johnson | May 29, 1951 |
| 2,645,111 | Fields | July 14, 1953 |

FOREIGN PATENTS

| | | |
|---|---|---|
| 602,378 | France | Mar. 17, 1926 |
| 526,423 | Great Britain | Sept. 18, 1940 |